(12) United States Patent
Guillotel et al.

(10) Patent No.: US 10,271,060 B2
(45) Date of Patent: Apr. 23, 2019

(54) METHODS AND DEVICES FOR GENERATING, ENCODING OR DECODING IMAGES WITH A FIRST DYNAMIC RANGE, AND CORRESPONDING COMPUTER PROGRAM PRODUCTS AND COMPUTER-READABLE MEDIUM

(71) Applicant: THOMSON LICENSING, Issy les Moulineaux (FR)

(72) Inventors: Philippe Guillotel, Vern sur Seiche (FR); Martin Alain, Rennes (FR); Dominique Thoreau, Cesson Sevigne (FR); Mehmet Turkan, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 107 days.

(21) Appl. No.: 15/092,587

(22) Filed: Apr. 6, 2016

(65) Prior Publication Data
US 2016/0300335 A1    Oct. 13, 2016

(30) Foreign Application Priority Data
Apr. 9, 2015   (EP) .................................... 15305520

(51) Int. Cl.
*H04N 19/30*   (2014.01)
*H04N 19/46*   (2014.01)

(52) U.S. Cl.
CPC ............. *H04N 19/46* (2014.11); *H04N 19/30* (2014.11); *G06T 2207/20208* (2013.01)

(58) Field of Classification Search
CPC ....... H04N 19/105; H04N 19/176; G06T 7/49
See application file for complete search history.

(56) References Cited

U.S. PATENT DOCUMENTS

| | | | | |
|---|---|---|---|---|
| 8,233,739 | B1 * | 7/2012 | Cho ...................... | G06T 11/60 345/582 |
| 8,340,463 | B1 * | 12/2012 | Cho ..................... | G06K 9/6297 382/162 |
| 9,681,129 | B2 * | 6/2017 | Amonou ................ | H04N 19/50 |
| 2006/0104542 | A1 * | 5/2006 | Blake ..................... | G06K 9/469 382/284 |
| 2007/0201560 | A1 * | 8/2007 | Segall .................... | H04N 19/61 375/240.24 |

(Continued)

FOREIGN PATENT DOCUMENTS

| | | |
|---|---|---|
| EP | 1827024 | 8/2007 |
| WO | WO2012004709 | 1/2012 |
| WO | WO2012097919 | 7/2012 |

OTHER PUBLICATIONS

Jojic et al., "Epitomic analysis of appearance and shape", Proceedings of the 8th IEEE International conference on computer vision (ICCV), Nice, France, Oct. 13, 2003, pp. 34-41.

(Continued)

*Primary Examiner* — Gandhi Thirugnanam

(57) ABSTRACT

A method for generating at least one image with a first dynamic range, from an image with a second dynamic range, which is lower than the first dynamic range is described. The method includes obtaining an epitome of the image with a first dynamic range, called a first epitome. Thereafter, the image with a first dynamic range is generated from the image with a second dynamic range and the first epitome.

12 Claims, 3 Drawing Sheets

(56) References Cited

U.S. PATENT DOCUMENTS

| | | | | |
|---|---|---|---|---|
| 2009/0208110 | A1* | 8/2009 | Hoppe | G06T 9/00 382/190 |
| 2012/0288015 | A1* | 11/2012 | Zhang | H04N 7/54 375/240.26 |
| 2013/0028330 | A1* | 1/2013 | Zhang | G06T 1/00 375/240.22 |
| 2013/0107956 | A1* | 5/2013 | Muijs | G06T 9/004 375/240.12 |
| 2013/0215965 | A1* | 8/2013 | Amonou | H04N 19/00569 375/240.12 |
| 2013/0223529 | A1* | 8/2013 | Amonou | H04N 19/00569 375/240.12 |
| 2013/0287296 | A1* | 10/2013 | Li | H04N 5/2355 382/167 |
| 2014/0029667 | A1* | 1/2014 | Cherigui | H04N 19/61 375/240.12 |
| 2014/0029672 | A1* | 1/2014 | Cherigui | H04N 19/593 375/240.16 |
| 2015/0215629 | A1* | 7/2015 | Alain | H04N 19/593 382/243 |

OTHER PUBLICATIONS

Aguerrebere et al., "Simultaneous HDR image reconstruction and denoising for dynamic scenes", 2013 IEEE international conference on computational photography (ICCP 2013), Cambridge, Massachusetts, USA, Apr. 19, 2013, pp. 1-11.

Cherigui et al., "Epitome-based image compression using translational sub-pel mapping", 2011 IEEE International Conference on Multimedia Signal Processing, Hangzhou, China, Oct. 17, 2011, pp. 1-6.

Anonymous, "Information technology JPEG XR image coding system image coding specification", International Telecommunications Union Standardization Sector, T.832, Series T: Terminals for Telematic Services Still-image compression—JPEG XR, Jan. 2012, pp. 1-218.

Lasserre et al., "High dynamic range video coding", Joint Collaborative Team on Video Coding of ITU-T SG 16 WP 3 and ISO/IEC JTC 1/SC 29/WG 11, 16th meeting, San José, California, USA, Jan. 9, 2014, pp. 1-9.

Masia et al., "Evaluation of reverse tone mapping through varying exposure conditions", ACM Transaction on Graphics, vol. 28, No. 5, (2009), pp. 1-8.

Rempel et al., "Ldr2Hdr: On-the-fly Reverse Tone Mapping of Legacy Video and Photographs", ACM Transactions on Graphics, vol. 26, No. 3, Jul. 2007, pp. 1-6.

Anonymous, "High Dynamic Range Electro-Optical Transfer Function of Mastering Reference Displays", Society of Motion Picture and Television Engineers Standard, SMPTE ST 2084, Aug. 14, 2014, pp. 1-14.

Wang et al., "Factoring Repeated Content Within and Among Images", Proceedings of ACM SIGGRAPH 2008, vol. 27, No. 3, 2008, pp. 1-16.

Ward et al., "JPEG-HDR: A Backwards-Compatible, High Dynamic Range Extension to JPEG", Proceedings of ACM SIGGRAPH 2005 Courses, Article No. 2, 2005, pp. 1-8.

Banterle et al., "Real-Time high fidelity inverse tone mapping for low dynamic range content", EUROGRAPHICS 2013, Girona, Spain, May 6, 2013, pp. 1-4.

Turkan et al., "Optimized Neighbor Embeddings for Single-Image Super-Resolution", 2013 IEEE International Conference on Image Processing, Melbourne, Australia, Sep. 15, 2013, pp. 645-649.

Turkan et al., "Iterated Neighbor-Embeddings for Image Super-Resolution", 2014 IEEE International Conference on Image Processing, Paris, France, Oct. 27, 2014, pp. 1-5.

* cited by examiner

METHODS AND DEVICES FOR GENERATING, ENCODING OR DECODING IMAGES WITH A FIRST DYNAMIC RANGE, AND CORRESPONDING COMPUTER PROGRAM PRODUCTS AND COMPUTER-READABLE MEDIUM

This application claims the benefit, under 35 U.S.C. § 119 of European Patent Application No. 15305520.7, filed Apr. 9, 2015.

1. TECHNICAL FIELD

The present disclosure relates to the processing of images or sequences of images, also called video.

More specifically, the present disclosure offers a technique for generating at least one image with a higher dynamic range, for example a HDR image ("High Dynamic Range"), from at least one image with a lower dynamic range, for example a LDR image ("Low Dynamic Range") or a current dynamic range image.

The present disclosure is particularly adapted to any applications related to HDR video production, distribution and rendering. The present disclosure concerns video compression and representations, but also image enhancement, also known as rendering.

In particular, the present disclosure aims at improving the encoding and decoding of images or video with a high dynamic range.

At least one embodiment of the disclosure also aims at improving inverse Tone Mapping Operators or super-resolution techniques.

2. BACKGROUND ART

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The dynamic range is, by definition, the ratio between the largest and smallest possible value of the changeable quantity corresponding to the luminance, which is a photometric measure of the luminous intensity per unit area of light travelling in a given direction (luminance being expressed in $cd/m^2$).

Different techniques have been proposed in order to generate an image/video with a higher dynamic range from an image/video with a lower dynamic range.

A first known technique relies on the use more sensitive sensors (such as RED or HARRI cameras), multi camera setup (using a stereo rig with no parallax and one over exposed and one under exposed camera) or temporal bracketing (shooting the same image successively with different apertures) to capture directly HDR image/video.

However, such devices are very expensive and the captured HDR images need to be converted in lower dynamic range images to be encoded and transmitted.

In addition, the temporal bracketing is mainly used for photos/static images because of the motion blur created for video.

A second known technique relies on manual creation. During the color management process, it is possible to extend the colors and brightness of an image based on the rendering on a reference display. Such technique is a traditional post-processing performed for movies.

However, such technique is time-consuming and does not generate an image with a natural light.

A third known technique relies on inverse Tone Mapping Operators (iTMO). ITMO are used to extend the dynamic from one range to a higher one. Such operators can be classified based on image processing algorithms used, such as global operators, where the same expansion function is used for all pixels, or local operators where the expansion function varies depending on the content.

However, such operators are not fully efficient today since it is difficult to obtain a realistic HDR video, with local variations, consistent temporally. This is a general problem when trying to extrapolate information from a reduce set of data.

The present disclosure overcomes at least one of the above-mentioned shortcomings.

3. SUMMARY

The present disclosure relates to a method for generating at least one image with a first dynamic range, from an image with a second dynamic range, which is lower than said first dynamic range, comprising:

obtaining an epitome of said image with a first dynamic range, called a first epitome, generating said image with a first dynamic range, from the image with a second dynamic range and the first epitome.

The present disclosure thus proposes a new technique for generating efficiently an image or video with a higher dynamic range (first dynamic range), from an image or video with a lower dynamic range (second dynamic range), assuming the availability of an epitome of the image or video with a higher dynamic range.

Such an epitome, also called first epitome, comprises information or meta-data that can be used to help the conversion of the image or video with a lower dynamic range, to the image or video with a higher dynamic range.

In particular, the image with a first dynamic range is a High Dynamic Range (HDR) image and the image with a second dynamic range is a Low Dynamic Range (LDR) image. HDR images can represent more accurately the range of intensity levels found in real scenes.

According to an embodiment of the disclosure, the image with a first dynamic range is generated with real light information obtained from the first epitome.

The first epitome, which comprises real light information, could thus be used to generate the image with a higher dynamic range, in a more realistic way than prior art techniques.

Such embodiment provides means to improve the inverse Tone Mapping Operators (iTMOs).

According to another embodiment of the disclosure, generating said image with a first dynamic range comprises:

determining an epitome of said image with a second dynamic range, called a second epitome, from the image with a second dynamic range, determining a mapping function between the second epitome and the image with a second dynamic range, applying said mapping function to the first epitome, to generate the image with a first dynamic range.

The mapping function, enabling to pass from the second epitome to the image with a second dynamic range, can thus be applied to the first epitome to generate the image with a first dynamic range.

According to a first example, the mapping function is a transformation map between the second epitome and the image with a second dynamic range.

Such a transformation map could be built during the construction of the second epitome.

According to a second example, the mapping function is a linear combination between at least one block in the image with a second dynamic range and K patches in the second epitome, with K an integer such as K>1.

According to this second example, the mapping function could be determined from a locally linear embedding (LLE) function.

The step of determining a mapping function thus comprises determining weights $w_{i,k}$ to be applied to each patch $z_{i,k}^l$ of said K patches in the second epitome, in order to obtain at least one block $x_i$ in the image with a second dynamic range, such as:

$$x_i = \sum_{k=1}^{K} w_{i,k} z_{i,k}^l$$

with $\Sigma_{k=1}^{K} w_{i,k}=1$ and K the number of patches in the second epitome obtained from one block of the image with a second dynamic range.

The step of applying said mapping function to the first epitome comprises determining, for said K patches in the second epitome, K corresponding patches in the first epitome (for example K co-localized patches).

Then, the weights $w_{i,k}$ are applied to each patch $z_{i,k}^h$ of said K corresponding patches in the first epitome, in order to reconstruct at least one block $y_i$ of the image with a first dynamic range, such as:

$$y_i = \sum_{k=1}^{K} w_{i,k} z_{i,k}^h$$

According to a third example, the mapping function is determined from a regression function, for example linear regression or Kernel regression.

According to another embodiment, generating said image with a first dynamic range further comprises up-sampling the image with a second dynamic range, in order to generate an up-sampled image with a first dynamic range.

In this way, up-sampling and conversion to a higher dynamic range could be implemented either at the same time, or in two successive steps.

According to another embodiment, the generating method comprises at least one iteration of:
  obtaining an estimated image with a second dynamic range, from said image with a first dynamic range for the first iteration, or from said corrected image with a first dynamic range for the following iterations,
  determining an estimation error between the image with a second dynamic range and the estimated image with a second dynamic range, and
  correcting the image with a first dynamic range, responsive to the estimation error, to obtain a corrected image with a first dynamic range.

Such iterative back-projection technique can be used to check whether the image with a first dynamic range is consistent.

The present disclosure also pertains to a method for encoding at least one image with a first dynamic range, comprising:
  determining an epitome of said image with a first dynamic range, called a first epitome,
  obtaining an image with a second dynamic range, which is lower than said first dynamic range,
  encoding said image with a second dynamic range, and
  encoding said first epitome.

Such encoding method proposes to encode the image with the second dynamic range and the first epitome, for storage or transmission.

Instead of encoding the image with the first dynamic range, it is proposed according to the disclosure to encode the image with the second dynamic range and the first epitome, which comprises information on the image with the first dynamic range.

This encoding enables a reduction of the size of the data to be transmitted.

In addition, the transmission of epitomes helps the conversion of the image or video with a second dynamic range, to the image or video with a first dynamic range, at a decoding side.

Furthermore, such epitome could be standardized and transmitted for encoding HDR image or video, with a backward compatibility with traditional LDR image or video.

In particular, at an encoding side, the image with a second dynamic range could be obtained by down-converting the image with a first dynamic range into an image with a second dynamic range, using for example Tone Mapping Operators.

According to another example, the image with a second dynamic range could be directly available at the encoding side, for example from a capture device.

The present disclosure also pertains to a method for decoding at least one image with a first dynamic range, comprising:
  decoding an image with a second dynamic range, which is lower than said first dynamic range,
  decoding an epitome of said image with a first dynamic range, called a first epitome,
  generating said image with a first dynamic range, from the image with a second dynamic range and the first epitome.

In particular, generating the image with a first dynamic range from the image with a second dynamic range and the first epitome can implement the generating method as described above.

The proposed disclosure thus offers a new solution for improving the encoding and decoding of image/video with a first dynamic range, like HDR images/video, assuming availability of some information on the original images/video with a first dynamic range.

In particular, the proposed disclosure addresses the problem of the transmission/compression of HDR images/video, by encoding and transmitting an epitome of the image with the first dynamic range and the image with the second dynamic range, instead of encoding and transmitting the image with the first dynamic range.

The present disclosure also concerns a device for generating at least one image with a first dynamic range, from an image with a second dynamic range, which is lower than said first dynamic range, comprising:

a module for obtaining an epitome of said image with a first dynamic range, called a first epitome, a module for generating said image with a first dynamic range, from the image with a second dynamic range and the first epitome.

Such a device can be especially adapted to implement the generating method described here above. It could of course comprise the different characteristics pertaining to the generating method according to an embodiment of the disclosure, which can be combined or taken separately. Thus, the characteristics and advantages of the device are the same as those of the generating method and are not described in more ample detail.

In addition, the present disclosure concerns a device for encoding at least one image with a first dynamic range, comprising:

a module for determining an epitome of said image with a first dynamic range, called a first epitome, a module for obtaining an image with a second dynamic range, which is lower than said first dynamic range, a module for encoding said image with a second dynamic range, and a module for encoding said first epitome.

Such a device can be especially adapted to implement the encoding method described here above. It could of course comprise the different characteristics pertaining to the encoding method according to an embodiment of the disclosure, which can be combined or taken separately. Thus, the characteristics and advantages of the device are the same as those of the encoding method and are not described in more ample detail.

Furthermore, the present disclosure pertains to a device for decoding at least one image with a first dynamic range, comprising:

a module for decoding an image with a second dynamic range, which is lower than said first dynamic range, a module for decoding an epitome of said image with a first dynamic range, called a first epitome, a module for generating said image with a first dynamic range, from the image with a second dynamic range and the first epitome.

Once again, such a device can be especially adapted to implement the decoding method described here above. It could of course comprise the different characteristics pertaining to the decoding method according to an embodiment of the disclosure, which can be combined or taken separately. Thus, the characteristics and advantages of the device are the same as those of the decoding method and are not described in more ample detail.

Another aspect of the disclosure pertains to a computer program product downloadable from a communication network and/or recorded on a medium readable by computer and/or executable by a processor comprising software code adapted to perform a generating method and/or an encoding method and/or a decoding method, wherein the software code is adapted to perform the steps of at least one of the methods described above.

In addition, the present disclosure concerns a non-transitory computer readable medium comprising a computer program product recorded thereon and capable of being run by a processor, including program code instructions for implementing the steps of at least one of the methods previously described.

Certain aspects commensurate in scope with the disclosed embodiments are set forth below. It should be understood that these aspects are presented merely to provide the reader with a brief summary of certain forms the disclosure might take and that these aspects are not intended to limit the scope of the disclosure. Indeed, the disclosure may encompass a variety of aspects that may not be set forth below.

4. BRIEF DESCRIPTION OF THE DRAWINGS

The disclosure will be better understood and illustrated by means of the following embodiment and execution examples, in no way limitative, with reference to the appended figures on which:

Figure 1:
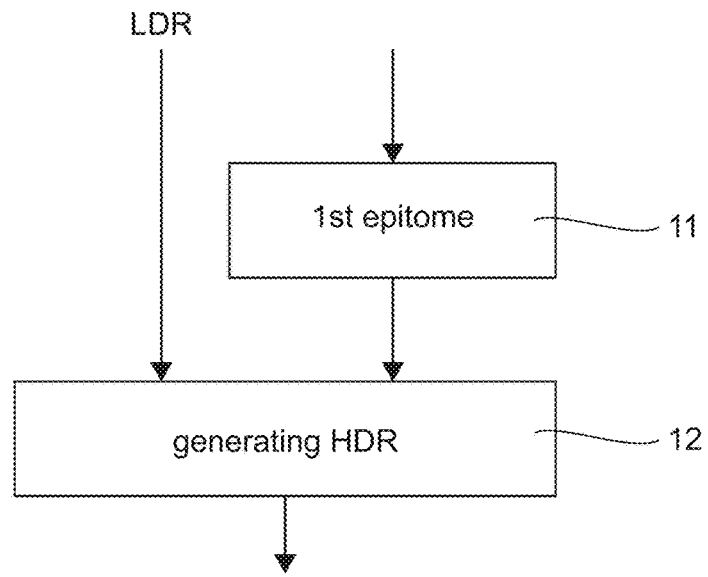
FIG. 1 is a flow chart illustrating the main steps of a method for generating an image with a first dynamic range from an image with a second dynamic range according to an embodiment of the disclosure.
Figure 3:
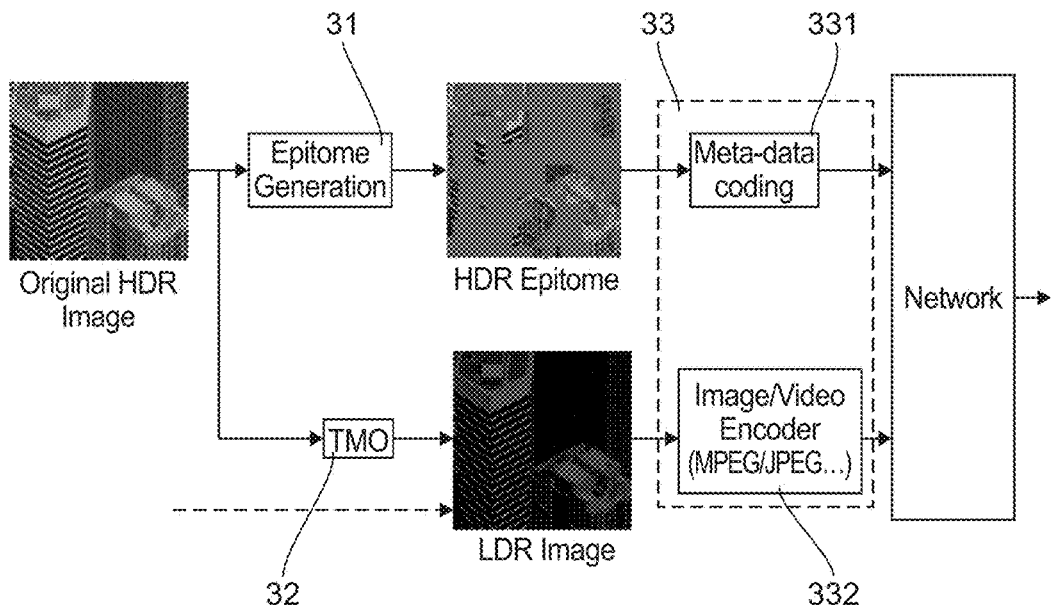
FIG. 3 illustrates the main steps of a method for encoding an image with a first dynamic range according to an embodiment of the disclosure.
Figure 4:
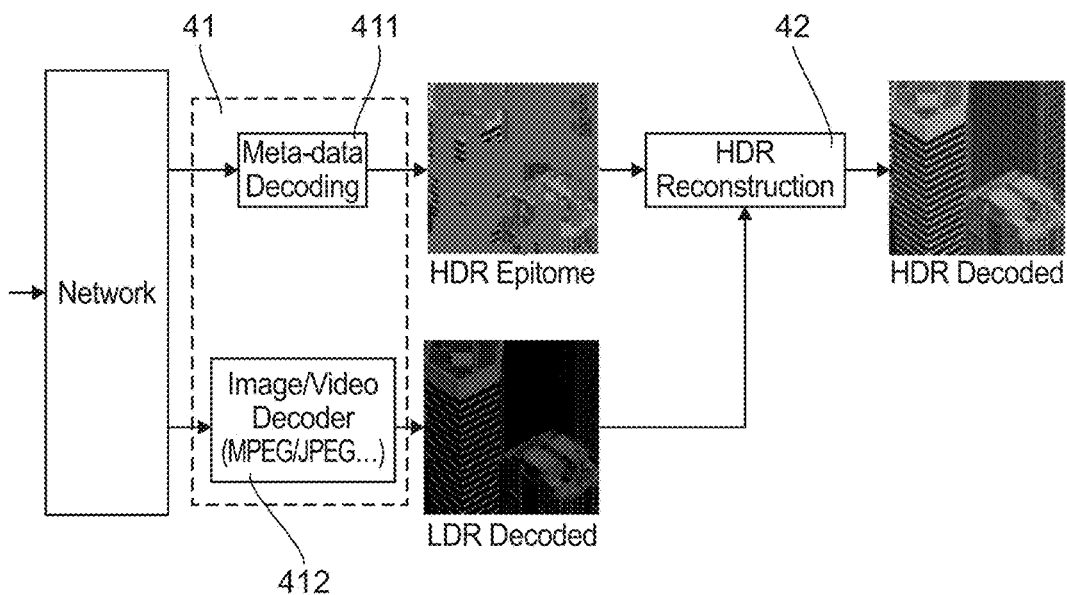
Figure 5:
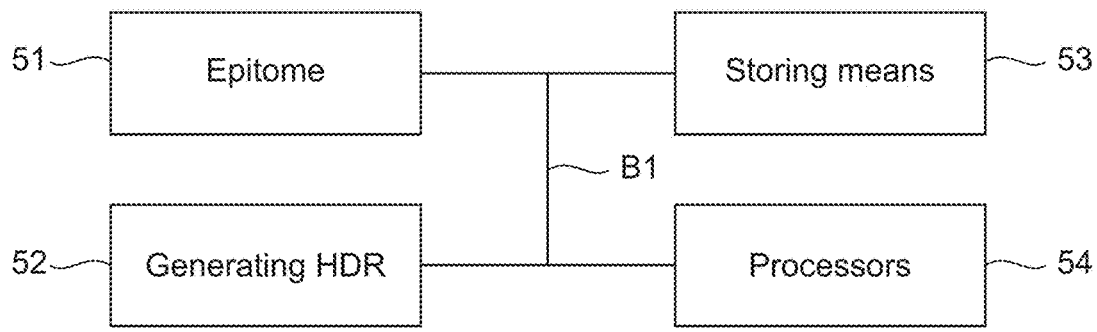
Figure 6:
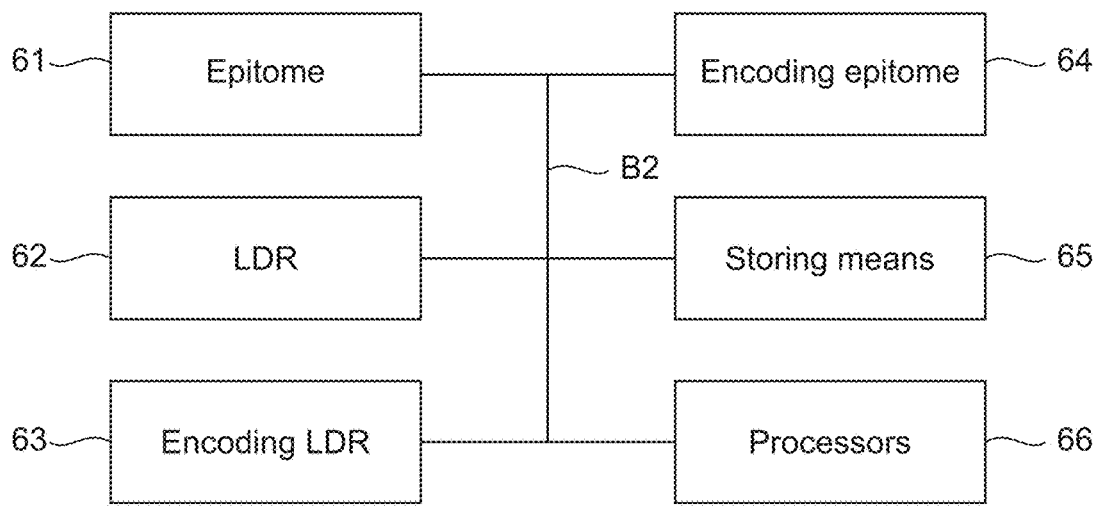
Figure 7:
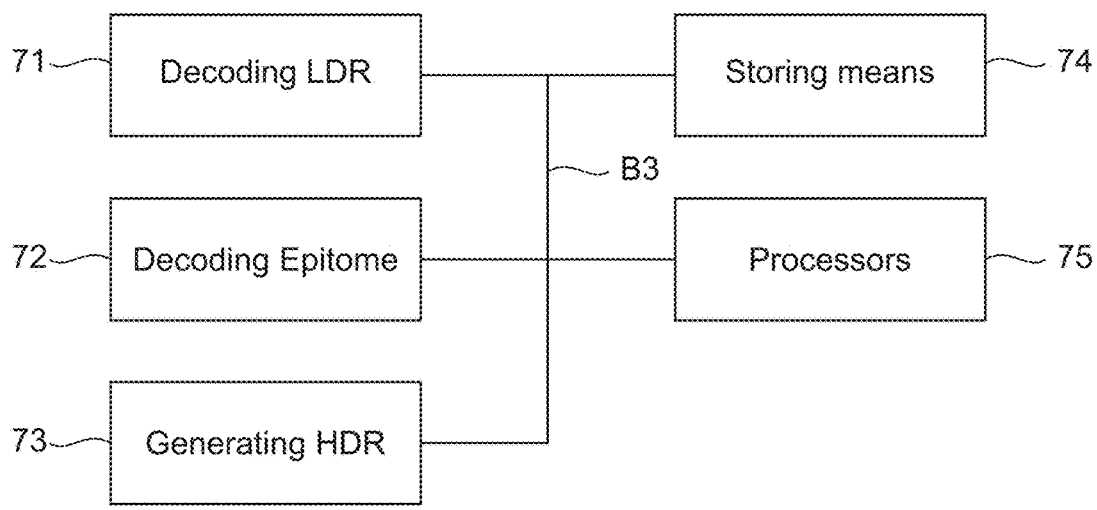

FIG. 4 presents the main steps of a method for decoding an image with a first dynamic range according to an embodiment of the disclosure;

FIG. 5 is a block diagram of a device implementing the generating method according to FIG. 1;

FIG. 6 is a block diagram of a device implementing the encoding method according to FIG. 3; and FIG. 7 is a block diagram of a device implementing the decoding method according to FIG. 4.

In FIGS. 1 and, 3 to 7, the represented blocks are purely functional entities, which do not necessarily correspond to physically separate entities. Namely, they could be developed in the form of software, hardware, or be implemented in one or several integrated circuits, comprising one or more processors.

5. DESCRIPTION OF EMBODIMENTS

It is to be understood that the figures and descriptions of the present disclosure have been simplified to illustrate elements that are relevant for a clear understanding of the present disclosure, while eliminating, for purposes of clarity, many other elements found in typical encoding and/or decoding devices.

5.1 Generating Image/Video with a First Dynamic Range, from Image/Video with a Second Dynamic Range 5.1.1 General Principle The main steps of the method for generating at least one image with a first dynamic range, from an image with a second dynamic range, which is lower than said first dynamic range, are illustrated in FIG. 1.

Let's consider, for example, that the image with a first dynamic range is a HDR image and the image with a second dynamic range is a LDR image.

During a first step 11, an epitome of the image with a first dynamic range (HDR image), called a first epitome or epitome HDR, is obtained.

The epitome approach aims at reducing redundant information (texture) in the image by exploiting repeated content within an image. Different techniques can be used to construct the first epitome. For example, the techniques disclosed by H. Hoppe ("Factoring Repeated Content Within and Among Images"—ACM Transaction on Graphics, vol. 27, no. 3, pp. 1-10, 2008) or S. Chérigui ("Epitome-based image compression using translational sub-pel mapping"—Proceedings of IEEE MMSP 2011), or the technique disclosed in PCT application WO2012/097919 ("Method and device for extracting an epitome"—THOMSON LICENSING) could be applied to an original image with a first dynamic range, available at an encoding side, to compute the first epitome. As these techniques are described for any type of images/video, they naturally apply to HDR images/video.

In addition, the encoding of the first epitome can be standardized and transmitted for encoding HDR images with a backward compatibility with traditional LDR images/video.

During a second step 12, the image with a first dynamic range (HDR image) is generated from the image with a second dynamic range (LDR image) and the first epitome (HDR epitome).

In other words, the disclosure aims at changing the luminance values of pixels of the LDR image, which has a lower dynamic range, to obtain a HDR image with a higher dynamic range.

For example, the first epitome could be received by a decoder, which can generate the image with a first dynamic range from the first epitome and the image with a second dynamic range. The first epitome is thus used to help the conversion from LDR to HDR.

Let's now describe in more details the second step 12 of generating the image with a first dynamic range from the image with a second dynamic range and the first epitome.

5.1.2 Using Real Light Information

According to at least one embodiment of the disclosure, inverse Tone Mapping Operators from the state of the art could be improved using the above-mentioned technique.

ITMOs, such as described by Banterle et al. in "Real-Time High Fidelity Inverse Tone Mapping for Low Dynamic Range Content", in proceedings of EuroGraphics 2013, are generally used to extend the dynamic of an image/video from one range to a higher one.

According to this technique, a LDR image is first linearized, using the camera response function or removing gamma. The linearized image is then expanded using the inverse of photographic operator, which provides a controllable non-linear expansion curve. This is defined as:

$$L_w(x) = L_{white}^2 \beta \left( L_d(x) - 1 + \sqrt{(1 - L_d(x))^2 + \frac{4}{L_{white}^2} L_d(x)} \right) \quad (1)$$

where $L_w(x)$ is the expanded luminance at a pixel x of the linearized image, $L_d(x)$ is the input linearized LDR luminance, $L_{white}$ determines the stretching of the curve, and $\beta$ is a parameter and determines the desired maximum luminance output.

Light source samples are then extracted from the linearized LDR image using a sampling algorithm, e.g. median-cut. Then, a smooth field $\Lambda$ is generated using the density estimation as:

$$\Lambda(x, r_s) = \frac{1}{|\Omega| V(\Omega)} \sum_{p \in \mathscr{P}} K\left(\frac{\|x - y_p\|}{r_{max}}\right) \Psi_p \quad (2)$$

where x is the position of the current pixel to evaluate, $\Omega$ is the set of samples inside the sphere of center x and radius $r_s$, V is the volume of $\Omega$m, $\Psi_p$ is the power of the p-th sample, and K is the Kernel Density Estimator defined by:

$r_{max}$: a parameter of the density estimator, called the bandwidth, which changes the strength of the filtering, $\mathscr{P}$: the sub-space of the original image around x (or the size of the kernel), $y_p$: the set of samples around x, included into the sub-space $\mathscr{P}$.

During sampling, a few isolated samples can be generated due to the presence of large low luminance areas. These can produce isolated outliers, i.e. areas that do not need to be expanded. This issue can be solved by clamping the sets that void the density estimation, if $\|\Omega\| <$ nsmin where nsmin is a threshold.

Once the smooth field $\Lambda$ is computed and filtered using a cross-bilateral filter, the expanded values $L_w(x)$ and linearized LDR luminance values $L_d(x)$ are linearly interpolated using $\Lambda(x)$ as weights for obtaining the final luminance values of the HDR image.

In order to improve existing iTMOs according to at least one embodiment of the disclosure, the $\Lambda(x)$ weights can be based on the real light conditions determined from the first epitome, instead of an extension of the real light conditions from the LDR image.

The "blind extrapolation" according to prior art techniques could indeed create artificial lights, whereas the epitome insures real values. The epitome thus provides real light information, even if it is sparse, that the iTMO could use.

In that case, a nearest matching criteria could be used to find the closest epitome chart from the light map or expand map (as named by Banterle) which is the weight factor map that allows to extend the light of the LDR image to generate the HDR image. Alternatively, the epitome from the same location (when existing) could be used to replace the extrapolated value by the real one. Spatial filtering then smoothes the light map. It should be noted that this technique applies to all kind of iTMOs.

To find the nearest matching epitome for the current block, one solution consists to compute the difference between the current block and all the epitome blocks and select the one with the lowest difference (nearest match). The difference could be computed after removing the average luminance value of the blocks to take into account the light level difference between the LDR and HDR blocks. Alternatively, the HDR epitome can be converted first to a LDR epitome (as described before) in order to then compute the difference in the same light domain.

During step 12, the image with a first dynamic range can thus be generated with real light information obtained from the first epitome.

5.1.3 Determining a Mapping Function

According to at least one embodiment of the disclosure, a mapping function could be used to generate the image with a first dynamic range from the image with a second dynamic range and the first epitome.

Such a mapping function could be determined between an epitome of the image with a second dynamic range, called a second epitome, and the image with a second dynamic range, and could then be applied to the first epitome, in order to generate the image with a first dynamic range.

The second epitome could be determined using any techniques, such as for example the one disclosed by H. Hoppe, by S. Chérigui or the technique disclosed in PCT application WO2012/097919 previously mentioned. For example, the first and second epitomes could be computed using the same technique, such that the appropriate information is included in both epitomes. According to another example, the second epitome is computed from the blocks of the second image located at the same positions than the blocks of the first image used for the computation of the first epitome.

The mapping function could be of different type.

According to a first example, the mapping function is a transformation map between the second epitome and the image with a second dynamic range. The transformation map comprises a set of assignation vectors designed for mapping the second epitome to the image with a second dynamic range.

Such a transformation map is for example outputted with the epitome using the above-mentioned technique for computing epitome disclosed by S. Chérigui.

The image with the first dynamic range can thus be simply generated by applying the transformation map to the first epitome, i.e. by applying to the first epitome the same assignation vectors than the ones designed for mapping the second epitome to the image with a second dynamic range.

According to a second example, the mapping function is determined from a locally linear embedding technique (LLE), and is a linear combination between at least one block in the image with a second dynamic range and K patches in the second epitome, with K>1 (where a patch is a piece of texture information extracted from the epitome).

According to this second example, weights $w_{i,k}$ to be applied to each patch $z_{i,k}^l$ of said K patches in the second epitome, in order to obtain at least one block $x_i$ in the image with a second dynamic range, are determined, such as:

$$x_i = \sum_{k=1}^{K} w_{i,k} z_{i,k}^l$$

with $\Sigma_{k=1}^{K} w_{i,k}=1$ and K the number of patches in the second epitome obtained from one block of the image with a second dynamic range.

Said K patches in the second epitome are determined from K corresponding patches selected in the first epitome.

The weights $w_{i,k}$ are then applied to each patch $z_{i,k}^h$ of said K corresponding patches in the first epitome, in order to reconstruct at least one block $y_i$ of the image with a first dynamic range, such as:

$$y_i = \sum_{k=1}^{K} w_{i,k} z_{i,k}^h$$

Instead of using LLE function, non-local means (NLM) functions could be used to determine the mapping function.

For example, according to a third example, the mapping function is determined using linear regression or Kernel regression. Then, instead of the LLE for example, one can use another local learning technique such as linear or kernel regression.

For example, for each overlapping block (the overlapping factor is a parameter which can be tuned, and could be set to 7 for 8×8 block) of an image with a second dynamic range, one searches for the K nearest neighbors (K-NN) patches in the second epitome. The corresponding (i.e. co-localized or at the same position) patches in the first epitome are also selected, thus forming pairs of patches used to learn a mapping function $F_1$ using regression (linear regression or kernel regression).

Then, considering multivariate linear regression, the problem is of searching for the function $F_1$ minimizing:

$$\|(M_h)^T - (M_l)^T F_1^T\|^2$$

Such function is in the form $\|Y-XB\|^2$ and thus corresponds to the linear regression model $Y=XB+E$.

The minimization of such function gives the least squares estimator: $F_1 = M_h(M_l)^T (M_l(M_l)^T)^{-1}$ Where $M_h$ is a matrix whose columns are formed by the first epitome patches $X_i^h$, $M_l$ is a matrix whose columns are formed by the second epitome corresponding patches $X_i^l$, with $i=1 \ldots K$, and $(.)^T$ is the transpose operator.

The second epitome patches $X_i^l$ are taken from the image with a second dynamic range, and their positions coincide with the positions of the first epitome patches $X_i^h$.

5.1.4 Improving Super-Resolution Techniques

Super-resolution techniques could also be improved using the above-mentioned technique.

More specifically, classical super-resolution techniques try to fuse a set of low-resolution (LR) images in order to recover an unknown high-resolution (HR) image.

For example, it has been proposed in IEEE International Conference on Image Processing (ICIP) 2013, "Optimized Neighbor Embeddings For Single-Image Super-Resolution" M. Turkan et al., and IEEE International Conference on Image Processing (ICIP) 2014, "Iterated Neighbor-Embeddings For Image Super-Resolution" M. Turkan et al., a pyramidal super-resolution (SR) method from a single low-resolution image without using any external information or database. This method relies on local geometric similarities of low-resolution and high-resolution image patch spaces. The intrinsic geometric property of an input (mean subtracted or not) LR patch neighborhood is obtained from the input LR patch and its K nearest neighbors (K-NN) taken from the across scales of the LR image.

The local LR geometry is characterized linearly with the locally linear embedding (LLE) reconstruction coefficients of the input LR patch from its K-NN. The HR embedding is then estimated (hallucinated) from the corresponding (mean subtracted or not) HR parents of the found K-NN of the input LR patch, by assuming the local LR geometry has been preserved in the HR patch space. An estimate of the current HR patch is then obtained by adding the mean value of the input LR patch. For each patch in the LR image, a HR embedding has been calculated preserving the local geometry of the LR neighborhood. An overlap between patches is allowed as much as possible in order to enforce the local compatibility and smoothness constraints in the target HR image.

The overlap region pixels can be then linearly combined depending on a sparse representation based weighting measure. In this method, a concatenation of input LR patch and estimated HR patch has been decomposed over a dictionary which is composed of LR and HR image patches taken from the LR image and its across scales. Using an exponential kernel, the patches are weighted depending on the sparseness of their representation, i.e., the sparsest representation is given the highest weighting, and so on.

According to at least one embodiment of the disclosure, any super-resolution techniques can be improved thanks to the availability of the epitome. For example, the multi-layer scheme described above can be adapted to the extension of the dynamic range.

Figure 2:
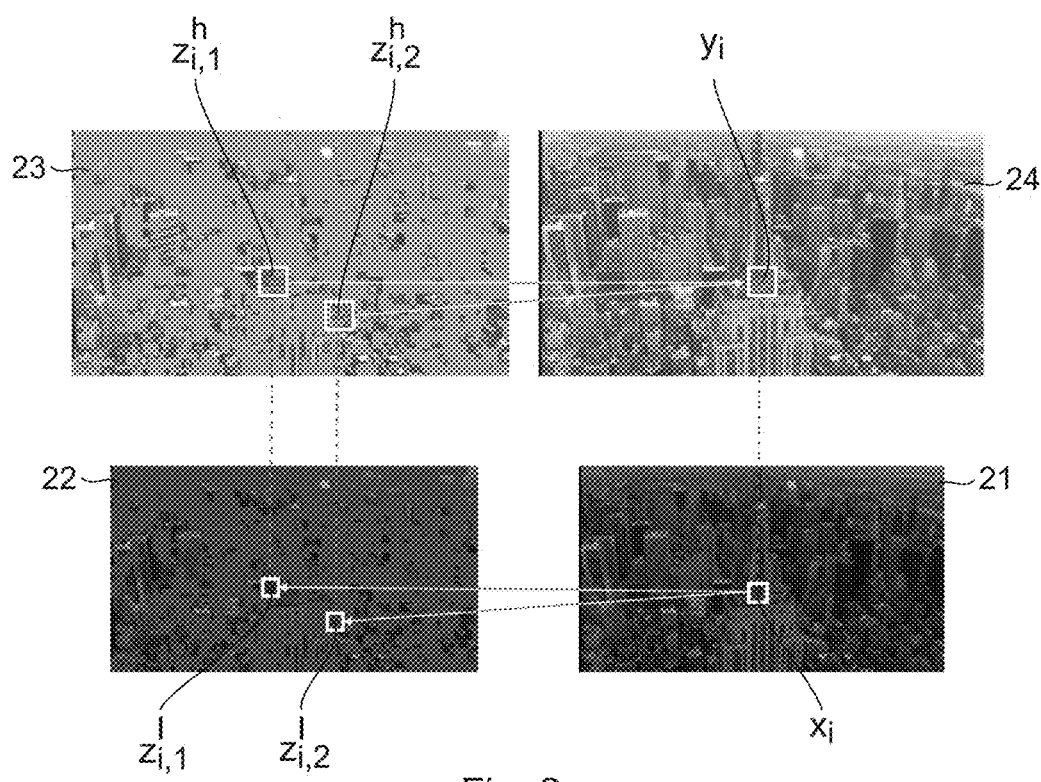
FIG. 2 depicts a super resolution technique applied to LDR to HDR conversion and up-scaling according to an embodiment of the disclosure.

Let's consider for example an image with a second dynamic range 21, corresponding to a LR image, and its second epitome 22, as depicted in FIG. 2. Let's also consider a first epitome 23 of an image with a first dynamic range 24, corresponding to a HR image, that we wish to obtain. In this example, we consider that the image with a first dynamic range that we want to generate is up-sampled compare to the image with a second dynamic range. Both the up-sampling and dynamic range conversion can thus be performed at the same time, or in two successive steps.

As an example, the LLE linear interpolation could be done using K-NN patches, with for example K=2 in FIG. 2. The K-NN patches are searched in the second epitome 22, and corresponding patches are identified in the first epitome 23.

The weights $w_{i,k}$ are thus computed on the "LR" data and applied to the K corresponding patches in the first epitome 23, to reconstruct the HDR version of the image/video.

The weights $w_{i,k}$ are computed as:

$$\left\| x_i = \sum_{k=1}^{K} w_{i,k} z_{i,k}^l \right\|_2^2$$

with $\Sigma_{k=1}^{K} w_{i,k} = 1$.

where i is the current location of block $x_i$ in the image with a second dynamic range (LDR block) to be interpolated, and k is the index of the K-NN selected patches $z_{i,k}^l$ in the second epitome (LDR epitome).

In other words, the weights $w_{i,1}$, $w_{i,2}$ to be applied respectively to each patch $z_{i,1}^l$, $z_{i,2}^l$ in the second epitome 22, in order to obtain at least one block $x_i$ in the image with a second dynamic range 21, are determined, such as $x_i = \Sigma_{k=1}^{2} w_{i,k} z_{i,k}^l$.

We note that the LLE removes the average luminance value when computing the weights $w_{i,k}$.

Once the weights $w_{i,k}$ are computed, they can be applied to each patch $z_{i,k}^h$ of the K corresponding patches in the first epitome, in order to reconstruct at least one block $y_i$ of the image with a first dynamic range, such as:

$$y_i = \sum_{k=1}^{K} w_{i,k} z_{i,k}^h$$

In other words, a linear interpolation is performed from the patches $z_{i,k}^h$ in the first epitome to reconstruct an HDR block, where the patches $z_{i,k}^h$ are the collocated (i,k) K-NN patches in the first epitome of the patches $z_{i,k}^l$ selected in the second epitome.

For example, the weights $w_{i,1}$, $w_{i,2}$ are applied respectively to each patch $z_{i,1}^h$, $z_{i,2}^h$ in the first epitome 23, in order to reconstruct at least one block $y_i$ of the image with a first dynamic range 24 (HDR block).

In particular, the size of the patch/block in the LR/LDR layer is lower than the size of the HR/HDR layer (the ratio is the ratio of the resolutions of the HR versus LR layers).

Existing super-resolution techniques could thus be improved using the disclosure.

It should be noted that if a correspondence map is available together with the epitome, the K-NN search is no longer necessary.

In addition, as described above, the mapping function could also be determined using NLM, such as linear regression or Kernel regression, instead of LLE.

5.1.5 Variants

According to an embodiment of the disclosure, depicted in FIG. 2, generating the image with a first dynamic range further comprises up sampling the image with a second dynamic range, in order to generate an up sampled image with a first dynamic range.

In this way, up-sampling and conversion to a higher dynamic range could be performed at the same time. According to another embodiment, up-sampling and conversion to a higher dynamic range are performed in two successive steps.

According to another embodiment, generating the image with a first dynamic range comprises at least one iteration of:
 obtaining an estimated image with a second dynamic range, from said image with a first dynamic range for the first iteration, or from said corrected image with a first dynamic range for the following iterations,
 determining an estimation error between the image with a second dynamic range and the estimated image with a second dynamic range, and
 correcting the image with a first dynamic range, responsive to the estimation error, to obtain a corrected image with a first dynamic range.

Iterative back-projection, used to check whether the generated images are consistent, can optionally be added for dynamic range conversion (HDR reconstruction), or both HDR reconstruction and up-scaling. Back projection consists in down-converting the reconstructed HDR(/HR) images to a LDR(/LR) image, computing the difference with the available LDR(/LR), and up-converting back this difference to HDR(/HR) difference to add it to the reconstructed HDR(/LR).

For the up-scaling operation, a linear interpolation filter is used, when for the dynamic operation we assume availability of a TMO and iTMO operators.

In addition, the techniques described above for overlapping blocks could be used for non-overlapping blocks.

5.2 Encoding/decoding Images/Video with a First Dynamic Range, from Image/Video with a Second Dynamic Range The method for generating at least one image with a first dynamic range, from an image with a second dynamic range, which is lower than said first dynamic range, could be used to improve the encoding/decoding of image/video with a first dynamic range.

Different techniques have been proposed in order to address the problem of the encoding/decoding of HDR image/video, and especially transmission/compression.

For instance JPEG standardized an extension of its coding scheme to support HDR images, as well as the JPEG-XR format that also supports HDR via the shared-exponent floating point color format known as RGBE and other 16-bit and 32-bit fixed point color component representations.

MPEG is also considering support of HDR video for MPEG HEVC.

However, such techniques suffer from the size of the data to be sent or on the limited quality of the reconstructed images.

5.2.1 Encoder

The main steps of the method for encoding at least one image with a first dynamic range according to the disclosure are illustrated in FIG. 3.

During a first step 31, an epitome of the image with a first dynamic range, for example an HDR image, is determined. The original HDR image can indeed be available at the encoding side.

During a second step 32, an image with a second dynamic range, which is lower than said first dynamic range, for example an LDR image, is obtained.

For example, the LDR image is obtained from the HDR image, using a Tone Mapping Operator. In variant, illustrated in dashed points, the LDR image is directly available at the encoding side, for example from a capture device.

During a third step 33, the image with a second dynamic range (LDR) and the first epitome (HDR epitome) are encoded. The first epitome could be encoded (331) using any device for meta-data encoding. It can be encoded using a traditional encoding scheme or a dedicated one. The image with a second dynamic range could be encoded (332) using any image or video encoder (MPEG, JPEG, . . . ).

The LDR image/video and the HDR epitome could then be transmitted separately, for example by using two different networks (broadcast and IP) or two IP links, or simultaneously, for example by multiplexing together the LDR image/video and the HDR epitome within the same stream, in order to reconstruct at the decoder side the first and second dynamic ranges image/video versions. The epitome can thus be considered as meta-data used to encode HDR images/video.

The first epitome could be transmitted as a dedicated MPEG SEI message, as an associated image (similar, for example, to the depth maps in MPEG), as private data, or using for example the MPEG-2 TS syntax.

It should be noted that if the epitome is sparse, a low bit-rate should be used.

5.2.2 Decoder

The main steps of the method for decoding at least one image with a first dynamic range according to the disclosure are illustrated in FIG. 4.

During a first step 41 of decoding, the image with a second dynamic range (LDR) and the first epitome (HDR epitome) are decoded. The first epitome could be decoded (411) using any device for meta-data decoding. It can be decoded using a traditional decoding scheme or a dedicated one. The image with a second dynamic range could be decoded (412) using any image or video decoder (MPEG, JPEG, . . . ).

During a second step 42, the image with a first dynamic range (HDR) is generated, or reconstructed, from the image with a second dynamic range and the first epitome (as decoded).

Such image with a first dynamic range could be generated using the generation method described above.

5.3 Devices

FIG. 5 diagrammatically illustrates an example of a device for generating at least one image with a first dynamic range, from an image with a second dynamic range, according to an embodiment of the disclosure. Only the essential elements of the generating device are shown.

Such a generating device comprises at least:
- a module 51 for obtaining an epitome of the image with a first dynamic range, called a first epitome;
- a module 52 for generating the image with a first dynamic range, from the image with a second dynamic range and the first epitome;
- storing means 53, such as a volatile memory;
- one or more processors 54 for executing the applications and programs stored in a non-volatile memory of the device;
- an internal bus B1 to connect the various modules and all means well known to the skilled in the art for performing the generating device functionalities.

FIG. 6 illustrates an example of a device for encoding at least one image with a first dynamic range, according to an embodiment of the disclosure. Only the essential elements of the encoding device are shown.

Such an encoding device comprises at least:
- a module 61 for determining an epitome of the image with a first dynamic range, called a first epitome;
- a module 62 for obtaining an image with a second dynamic range, which is lower than said first dynamic range;
- a module 63 for encoding the image with a second dynamic range;
- a module 64 for encoding said first epitome;
- storing means 65, such as a volatile memory;
- one or more processors 66 for executing the applications and programs stored in a non-volatile memory of the device;
- an internal bus B2 to connect the various modules and all means well known to the skilled in the art for performing the encoding device functionalities.

FIG. 7 illustrates an example of a device for decoding at least one image with a first dynamic range, according to an embodiment of the disclosure. Only the essential elements of the decoding device are shown.

Such a decoding device comprises at least:
- a module 71 for decoding an image with a second dynamic range, which is lower than said first dynamic range;
- a module 72 for decoding an epitome of the image with a first dynamic range, called a first epitome;
- a module 73 for generating the image with a first dynamic range, from the image with a second dynamic range and the first epitome;
- storing means 74, such as a volatile memory;
- one or more processors 75 for executing the applications and programs stored in a non-volatile memory of the device;
- an internal bus B3 to connect the various modules and all means well known to the skilled in the art for performing the decoding device functionalities.

Such generating device, encoding device, and/or decoding device could each be implemented according to a purely software realization, purely hardware realization (for example in the form of a dedicated component, like in an ASIC, FPGA, VLSI, . . . ), or of several electronics components integrated into a device or in a form of a mix of hardware elements and software elements.

The flowchart and/or block diagrams in the Figures illustrate the configuration, operation and functionality of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s).

For example, the module 51 for obtaining an epitome of the image with a first dynamic range and the module 52 for generating the image with a first dynamic range may be provided as software components stored in memory of the generating device. The one or more processing units 54 may be configured to execute the various software programs and/or sets of instructions of the software components to perform the respective functions of: obtaining an epitome of the image with a first dynamic range and generating the image with a first dynamic range, from the image with a second dynamic range and the first epitome, in accordance with various embodiments.

The module 61 for determining an epitome of the image with a first dynamic range, the module 62 for obtaining an image with a second dynamic range, the module 63 for encoding the image with a second dynamic range, and the module 64 for encoding said first epitome, may also be provided as software components stored in memory of the encoding device. The one or more processing units 66 may be configured to execute the various software programs and/or sets of instructions of the software components to perform the respective functions of: determining an epitome of the image with a first dynamic range, obtaining an image with a second dynamic range, encoding the image with a second dynamic range, and encoding said first epitome, in accordance with various embodiments.

The module 71 for decoding an image with a second dynamic range, the module 72 for decoding an epitome of the image with a first dynamic range, and the module 73 for generating the image with a first dynamic range, may be provided as software components stored in memory of the decoding device. The one or more processing units 75 may be configured to execute the various software programs and/or sets of instructions of the software components to perform the respective functions of: decoding an image with a second dynamic range, decoding an epitome of the image with a first dynamic range, called a first epitome, and generating the image with a first dynamic range, from the image with a second dynamic range and the first epitome, in accordance with various embodiments.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

As will be appreciated by one skilled in the art, aspects of the present principles can be embodied as a system, method, computer program or computer readable medium. Accordingly, aspects of the present principles can take the form of an entirely hardware embodiment, an entirely software embodiment (including firmware, resident software, microcode, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer disc, a hard disc, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

What is claimed is:

1. A method comprising:
   obtaining an epitome of an image with a first dynamic range, called a first epitome, the first epitome is a representation of the image with the first dynamic range having reduced redundant information,
   determining an epitome of an image with a second dynamic range, called a second epitome, from the image with the second dynamic range, the second epitome is a representation of the image with the second dynamic range having reduced redundant information, and the second dynamic range is lower than the first dynamic range,
   determining a transformation map between the second epitome and the image with the second dynamic range,
   applying the transformation map to the first epitome, to generate a reconstructed image of the image with the first dynamic range.

2. The method according to claim 1, wherein the generating the reconstructed image further comprises up sampling the image with the second dynamic range, in order to generate an up sampled image with the first dynamic range.

3. The method according to claim 1, wherein it comprises at least one iteration of:
   obtaining an estimated image with the second dynamic range, from the image with the first dynamic range for a first iteration, or from a corrected image with the first dynamic range for the following iterations,
   determining an estimation error between the image with the second dynamic range and the estimated image with the second dynamic range, and
   correcting the image with the first dynamic range, responsive to the estimation error, to obtain the corrected image with the first dynamic range.

4. A method for decoding comprising:
   decoding an image with a second dynamic range,
   obtaining an epitome of an image with a first dynamic range, called a first epitome, the first epitome is a representation of the image with the first dynamic range having reduced redundant information, and the second dynamic range is lower than the first dynamic range,
   determining an epitome of the image with the second dynamic range, called a second epitome, from the image with the second dynamic range, the second epitome is a representation of the image with the second dynamic range having reduced redundant information,
   determining a transformation map between the second epitome and the image with the second dynamic range,
   applying the transformation map to the first epitome, to generate a reconstructed image of the image with the first dynamic range.

5. The method according to claim 4, wherein the generating the reconstructed image further comprises up sampling the image with the second dynamic range, in order to generate an up sampled image with the first dynamic range.

6. The method according to claim 4, wherein it comprises at least one iteration of:
- obtaining an estimated image with the second dynamic range, from the image with the first dynamic range for a first iteration, or from a corrected image with the first dynamic range for the following iterations,
- determining an estimation error between the image with the second dynamic range and the estimated image with the second dynamic range, and
- correcting the image with the first dynamic range, responsive to the estimation error, to obtain the corrected image with a first dynamic range.

7. A device comprising at least one memory and one or more processors, the one or more processor being configured to:
- obtain an epitome of an image with a first dynamic range, called a first epitome, the first epitome is a representation of the image with the first dynamic range having reduced redundant information,
- determine an epitome of an image with a second dynamic range, called a second epitome, from the image with the second dynamic range, the second epitome is a representation of the image with the second dynamic range having reduced redundant information, and the second dynamic range is lower than the first dynamic range
- determine a transformation map between the second epitome and the image with the second dynamic range,
- apply the transformation map to the first epitome, to generate a reconstructed image of the image with the first dynamic range.

8. The device according to claim 7, wherein the one or more processor are further configured to up sample the image with the second dynamic range, in order to generate an up sampled image with the first dynamic range.

9. A device for decoding comprising at least one memory and one or more processors, the one or more processor being configured to:
- decode an image with a second dynamic range,
- obtain an epitome of an image with a first dynamic range, called a first epitome, the first epitome is a representation of the image with the first dynamic range having reduced redundant information, and the second dynamic range is lower than the first dynamic range,
- determine an epitome of the image with the second dynamic range, called a second epitome, from the image with the second dynamic range, the second epitome is a representation of the image with the second dynamic range having reduced redundant information, determine a transformation map between the second epitome and the image with the second dynamic range,
- apply the transformation map to the first epitome, to generate a reconstructed image of the image with the first dynamic range.

10. The device according to claim 9, wherein the one or more processor are further configured to up sample the image with the second dynamic range, in order to generate an up sampled image with the first dynamic range.

11. A non-transitory computer-readable medium comprising computer program instructions recorded thereon and capable of being executed by a processor for implementing a method comprising:
- obtaining an epitome of an image with a first dynamic range, called a first epitome, the first epitome is a representation of the image with the first dynamic range having reduced redundant information,
- determining an epitome of an image with a second dynamic range, called a second epitome, from the image with the second dynamic range, the second epitome is a representation of the image with the second dynamic range having reduced redundant information, and the second dynamic range is lower than the first dynamic range,
- determining a transformation map between the second epitome and the image with the second dynamic range,
- applying the transformation map to the first epitome, to generate a reconstructed image of the image with the first dynamic range.

12. The device according to claim 11, wherein the generating the reconstructed image further comprises up sampling the image with the second dynamic range, in order to generate an up sampled image with the first dynamic range.

* * * * *